United States Patent

Nakajima et al.

Patent Number: 5,164,035
Date of Patent: Nov. 17, 1992

[54] TIRE BUILDING APPARATUS

[75] Inventors: Tsuneharu Nakajima, Kodaira; Toshio Tokunaga, Fuchu; Hiroshi Nakashima, Kuroiso, all of Japan

[73] Assignee: Bridgestone Corporation, Tokyo, Japan

[21] Appl. No.: 691,286

[22] Filed: Apr. 25, 1991

[30] Foreign Application Priority Data

May 2, 1990 [JP] Japan .................. 2-116320

[51] Int. Cl.⁵ .............................. B29D 30/26
[52] U.S. Cl. ............................. 156/415; 156/420; 156/398
[58] Field of Search ............... 156/398, 403, 414, 415, 156/416, 417, 418, 419, 420, 421.8, 132, 135

[56] References Cited

U.S. PATENT DOCUMENTS

| | | | |
|---|---|---|---|
| 3,674,604 | 7/1972 | Gazuit | 156/417 X |
| 3,795,564 | 3/1974 | Mallory | 156/417 |
| 3,867,230 | 2/1975 | Van Horn et al. | 156/417 |
| 3,971,694 | 7/1976 | Gazuit | 156/132 X |
| 4,001,070 | 1/1977 | Bell | 156/398 |
| 4,214,939 | 7/1980 | Enders | 156/132 X |
| 4,239,579 | 12/1980 | Felten et al. | 156/415 X |
| 4,243,451 | 1/1981 | Kortman | 156/132 |
| 4,325,764 | 4/1982 | Appleby et al. | 156/123 |
| 4,486,259 | 12/1984 | Irie | 156/415 X |
| 4,683,021 | 7/1987 | Stalter et al. | 156/415 |

FOREIGN PATENT DOCUMENTS 7020564 6/1970 France.
7519374 6/1975 France.

Primary Examiner—Michael W. Ball
Assistant Examiner—Francis J. Lorin
Attorney, Agent, or Firm—Sughrue, Mion, Zinn, Macpeak & Seas

[57] ABSTRACT

A tire building apparatus includes a main hollow shaft, a rotatable screw shaft inserted in the main shaft, a pair of slider units axially movably supported so that upon rotating the screw shaft the slider units move through equal distances toward and away from each other, a pair of support member assemblies expansibly and contractibly supported by the slider units for supporting the bead portions of the green case on radially insides by the support member assemblies when expanded to increase their diameters, a pair of movable blocks axially movably supported to be able to abut against the slider units, a drum core in the form of a ring to surround the main shaft between the slider units, a link mechanism connecting the drum core and the movable blocks for expanding the drum core when the movable blocks move axially inwardly toward each other and contracting the drum core when the movable blocks move axially outwardly away from each other, a pair of stoppers for limiting axially outward movement of the movable blocks when the drum core contracts to its minimum diameter, and a spring for urging the movable blocks axially outwardly.

6 Claims, 3 Drawing Sheets

FIG_2

1

TIRE BUILDING APPARATUS

BACKGROUND OF THE INVENTION

1. Field of the Invention

This invention relates to a tire building apparatus for use in forming a green tire from a green case.

2. Related Art Statement

Tire building apparatuses have been known, for example, as disclosed in Japanese Patent Application Publication No. 55-1181. This disclosed tire building apparatus includes a main hollow shaft, and a rotating screw shaft inserted in the main shaft and formed on both axial end portions with screw threads in opposite directions. The apparatus further includes a pair of first sliders axially movably supported on the outer circumference of the main shaft at both axial end portions and connected to the screw shaft to move through equal distances toward and away from each other upon rotating the screw shaft, and a pair of second sliders axially movably supported on the outer circumference of the first sliders. The apparatus further includes a pair of support members expansibly and contractibly supported by the second sliders and having engagement portions adapted to engage inner surfaces of bead portions of a green case so that the bead portions are supported on their insides by the support members whose diameters increase, and a pair of cylinders for axially moving the second sliders together with the support members. Moreover, the apparatus includes a drum core substantially in the form of a ring composed of a plurality of segments circumferentially spaced and provided between the first sliders to surround the main shaft, and a link mechanism composed of a plurality of links connecting the drum core and the first sliders for expanding the drum core to increase its diameter when the first sliders move toward each other and contracting the drum core to reduce its diameter when the first sliders move away from each other.

In order to produce green tires of high quality, it is required to bring the width center portion of the drum core into coincidence with the axial center portion of a cylindrical green case. For the purpose of accomplishing such a coincidence of the center portions with the disclosed tire building apparatus, after the engagement portions of the support members have been engaged with inner surfaces of bead portions of a green case, the second sliders are moved axially outwardly together with the support members by means of the cylinders to pull the bead portions of the green case axially outwardly.

In the apparatus above described, the pair of cylinders are used for moving the support members. However, it is difficult to obtain two cylinders whose strokes in pulling operation are completely equal to each other. Therefore, this apparatus encounters a difficulty that the green case can be axially positioned only with low accuracy. Moreover, provision of these cylinders makes complicated the construction resulting in a large-sized apparatus.

In order to solve these problems, it may be conceivable that such cylinders are dispensed with, and even after the drum core has been contracted to reduce its diameter, the screw shaft is continuously rotated so as to axially outwardly move the first and second sliders to pull the bead portions of a green case axially outwardly. With such an arrangement, however, the radial movement of the drum core becomes large because the drum core further radially contracts to a smaller diameter than the reduced diameter. Such a large radial movement of the drum core could not be realized because it may exceed the limit stroke of the link mechanism. If it is intended to increase the limit stroke of the link mechanism, thicknesses and widths of the links unavoidably become too small so that the strength of the links would lower exceeding a range of practical use.

SUMMARY OF THE INVENTION

It is an object of the invention to provide an improved tire building apparatus which eliminates all the disadvantages of the prior art and which is simple in construction and small-sized and capable of positioning a green case in axial direction with high accuracy.

In order to accomplish the object, the tire building apparatus according to the invention comprises a main hollow shaft, a rotatable screw shaft inserted in the main shaft and formed on both end portions with male screw threads in opposite directions, a pair of slider units axially movably supported on the outer circumference of the main shaft at both end portions and connected to the screw shaft so that upon rotating the screw shaft the slider units move through equal distances toward and away from each other, a pair of support member assemblies expansibly and contractibly supported by the sliders units, respectively, and having engagement portions able to engage inner surfaces of bead portions of a green case so that the bead portions of the green case are supported on radially insides by the support member assemblies when expanded to increase their diameters, a pair of movable blocks axially movably supported on the outer circumference of the main shaft between the slider units to be able to abut against the slider units, a drum core substantially in the form of a ring provided to surround the main shaft between the slider units and composed of a plurality of segments circumferentially spaced, a link mechanism composed of a plurality of links connecting the drum core and the movable blocks and capable of expanding the drum core to increase its diameter when the movable blocks move axially inwardly toward each other and contracting the drum core to decrease its diameter when the movable blocks move axially outwardly away from each other, a pair of stoppers provided on the outer circumference of the main shaft between the slider units and the movable blocks to limit the axially outward movement of the movable blocks by engagement of the stoppers with the movable blocks when the drum core contracts to its minimum diameter, and a spring interposed between the pair of movable blocks for urging the movable blocks axially outwardly, thereby permitting the movable blocks to move together with the slider units on inner sides of positions where the movable blocks abut against the stoppers and permitting the slider units alone to move axially outwardly when the movable blocks abut against the stoppers.

It is now assumed that the movable blocks abut against the stoppers and the diameter of the drum core is at the minimum. After a cylindrical green case has been transferred to a position around the drum core, the support member assemblies are expanded so as to increase their diameters to support bead portions of the green case on their radially inner sides by the support member assemblies. Thereafter, the screw shaft is rotated to move the slider units in axial directions away from each other. At this time, the engagement portions of the support member assemblies engaging the bead portions of the green case move together with the slider units axially outwardly. Therefore, both the bead portions of the green case are pulled axially outwardly by the engagement portions so that the axially central portion of the green case is brought into coincidence with the width center portion of the drum core.

In this case, the axial movements of the slider units and the support member assemblies are performed with the aid of the rotation of the screw shaft. Therefore, the moved distances of the slider units and the support member assemblies are exactly equal to each other on the right and left sides. As a result of this, the green case is axially positioned with high accuracy.

In this case, moreover, the movable blocks abut against the stoppers so that they are prevented from further axial outward movement. Consequently, the slider units alone move axially outwardly, and the movable blocks remain stationary. As a result of this, the drum core does not further contract to a diameter smaller than the minimum value so that the strength of the link mechanism does not lower.

Thereafter, the screw shaft is rotated to move the slider units toward each other. On the way of the movement of the slider units, they abut against the movable blocks. Consequently, the movable blocks move axially inwardly together with the slider units after the abutment of the slider units against the movable blocks. When the movable blocks move axially inwardly toward each other in this manner, the links of the link mechanism are rocked to increase the diameter of the drum core. Therefore, the green case is formed in a toroidal shape.

Thereafter, a belt, a tread and the like are applied to the outside of the formed green case to form a green tire. The green tire is then grasped by means of transfer means and the support member assemblies are contracted to decrease their diameters so as to be removed from bead portions of the green tire. The screw shaft is then rotated so that the slider units move away from each other. At this moment, the movable blocks are urged by the spring and move axially outwardly abutting against the slider units, with the result that the drum core is contracted to reduce its diameter. When the movable blocks engage the stoppers, the axially outward movements of the movable blocks are limited by the stoppers. On the other hand, the drum core now exhibits the minimum diameter. Thereafter, the green tire is transferred out of the apparatus by means of the transfer means.

The invention will be more fully understood by referring to the following detailed specification and claims taken in connection with the appended drawings.

DESCRIPTION OF THE PREFERRED EMBODIMENT

Figure 1:
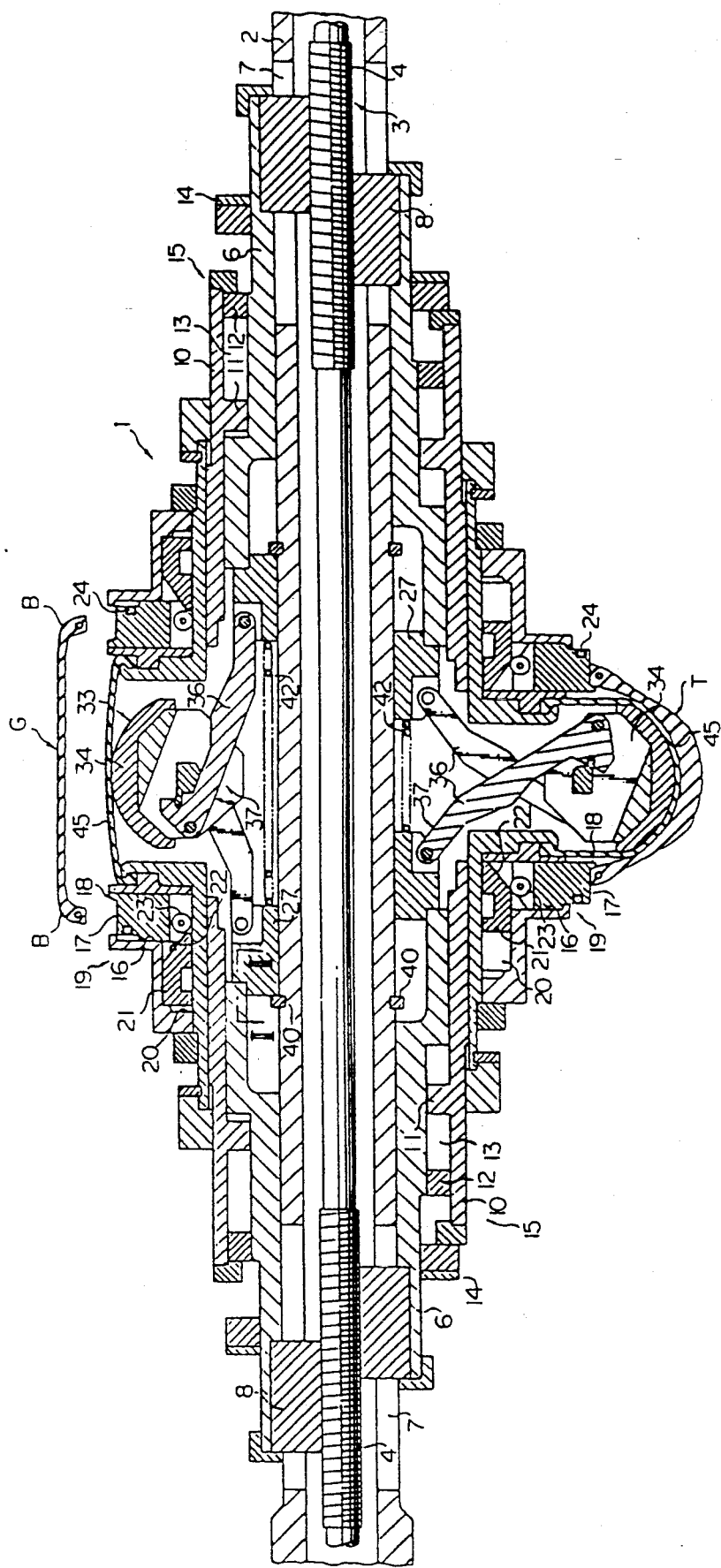
FIG. 1 is a sectional view of the apparatus of one embodiment according to the invention illustrating the apparatus in transferring a green case in the upper half above the center line in FIG. 1 and the apparatus in forming a green tire in the lower half below the center line.

Referring to FIG. 1, a tire building apparatus 1 comprises a main horizontal hollow shaft 2 rotatably supported by a driving section (not shown). The main shaft 2 is rotated about its axis by the driving section. A screw shaft 3 is provided on both end portions with male screw threads 4 turned in opposite directions, respectively, and is coaxially inserted into the main shaft 2. The screw shaft 3 is rotated about its axis by means of the driving section independently of the main shaft 2.

A pair of first sliders 6 substantially cylindrically formed are axially movably supported on outer circumferences on both axial end portions of the main shaft 2. A screw block 8 is secured to each of the first sliders 6 and inserted into each of slits 7 formed in the main shaft 2. These screw blocks 8 are threadedly engaged with the male screw threads 4 of the screw shaft 3, respectively. As the first sliders 6 are connected through the screw blocks 8 to the screw shaft 3 in this manner, when the screw shaft 3 is rotated, the first sliders 6 are moved through equal distances in opposite directions toward and away from each other.

A pair of second sliders 10 substantially cylindrically formed are axially movably supported on the outer circumferences of the first sliders 6. Each of the second sliders 10 is formed on its inner surface with an annular piston 11, and each of the first sliders 6 is provided on its outer circumference with a stationary ring 12 fixed thereto, with the result that a cylinder chamber 13 is formed between the piston 11 and the stationary ring 12. When pressurized air is supplied into the cylinder chamber 13 from a pressurized air source, the second sliders 10 move axially inwardly toward each other. On the other hand, when a vacuum source is connected to the cylinder chamber 13, the second sliders 10 move axially outwardly away from each other.

A stopper 14 is fixed to an outer circumference of each of the first sliders 6 on the axially outer side of the stationary ring 12 for limiting the axial outward movement of the second slider 10. The first sliders 6 and the second sliders 10 form as a whole a pair of sliders units 15.

Each of the second sliders 10 is formed therein with a plurality of radially extending guide grooves 16 circumferentially equally spaced, into which a plurality of support segments 17 are radially movably inserted, respectively. Each of the support segments 17 is formed with an engagement portion 18 at the axially inner end on the radially outer surface. The engagement portions 18 of the support segments 17 are adapted to engage inner surfaces of bead portions B of a green case G. The plurality of the segments 17 form as a whole support member assemblies 19 radially expansibly and contractibly supported by the pair of sliders 15. These support member assemblies 19 are also in pair because they are supported by the pair of sliders 15, respectively.

Each of the second sliders 10 is further formed therein with a plurality of cylinder chambers 20 corresponding to the guide grooves 16. Pistons 21 are axially movably inserted into the cylinder chambers 20, respectively. Each of the pistons 21 is formed with an inclined surface 22 on the axially inner side on the outer circumference and inclined axially inwardly toward the screw shaft 3. These inclined surfaces 22 engage rollers 23 rotatably supported by radially inner ends of the support segments 17, respectively. As a result of this, when the cylinder chambers 20 are connected to the pressurized air source to move the pistons 21 axially inwardly, the support segments 17 move radially outwardly so that the support member assemblies 19 are expanded to increase their diameters, with the result that the bead portions B of the green case G are supported on their insides by the support member assemblies 19.

Moreover, elastic rings 24 are provided on the support segments 17 for normally urging the support segments radially inwardly. As a result of this, when the cylinder chambers 20 are connected to the vacuum source to move the pistons 21 axially outwardly, the support segments 17 move radially inwardly by the urging force of the elastic rings 24 so that the support member assemblies 19 are contracted to reduce their diameters.

Figure 2:
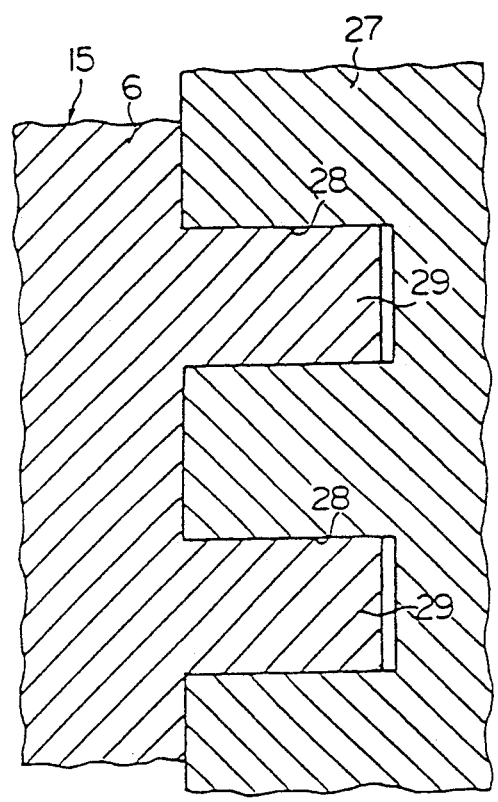
FIG. 2 is a sectional view taken along the line II—II in FIG. 1.

A pair of cylindrical movable blocks 27 are axially movably supported by the outer circumference of the main shaft 2 between the slider units 15. Each of the movable blocks 27 is formed in the axially outer end with a plurality of insert grooves 28 circumferentially equally spaced as shown in FIG. 2. On the other hand, each of the first sliders 6 are formed in its axially inner end with a plurality of projections 29 circumferentially equally spaced and adapted to be slidably inserted into the insert grooves 28 of the movable block 27. Consequently, the movable blocks 27 and the slider units 15 are axially movable relative to each other, but are prevented in relative rotating movements thereof.

Moreover, when the slider units 15 are moved axially inwardly, the axially inner ends of the first sliders 6 abut against the axially outer ends of the movable blocks 27. Under this condition, the slider units 15 and the movable blocks 27 can move axially inwardly in unison.

A drum core 33 substantially in the form of a ring as a whole is provided to surround the main shaft 2 between the slider units 15. The drum core 33 is composed of a plurality of segments 34 circumferentially equally spaced. Links 36 are in the same number of pairs as that of the segments 34 and have radially inner ends connected to the movable blocks 27 and radially outer ends connected to the segments 34. These links 36 form as a whole a link mechanism 37 connecting the drum core 33 and the movable blocks 27. When the movable blocks 27 are moved radially inwardly toward each other, the links of the link mechanism 37 are inclined so as to move their inner ends radially outwardly away from the main shaft 2 so that the drum core expands to increase its diameter. On the other hand, when the movable blocks 27 are moved radially outwardly away from each other, the link mechanisms 37 are inclined so as to move their inner ends radially inwardly toward the main shaft 2 so that the drum core contracts to reduce its diameter.

The main shaft 2 is provided on its outer acircumference with a pair of stoppers 40 in the form a ring between the slider units 15 and the movable blocks 27, respectively. These stoppers 40 are adapted to engage the movable blocks 27, respectively. When the movable blocks 27 move axially outwardly to engage the stoppers 40, the movable blocks 27 are prevented from moving in axially outward directions by means of the stoppers 40. At this moment, the drum core 33 has been contracted to the minimum diameter. A spring 42 is arranged to surround the axially central portion of the main shaft 2 and located between the movable blocks 27 for normally urging the movable blocks 27 axially outwardly.

A bladder 45 is made of a cylindrical thin rubber. Both the axial ends of the bladder 45 are hermetically secured to the second sliders 10 axially inwardly of the support member assemblies 19, while the axially central portion of the bladder 45 surrounds the drum core 33. The bladder 45 is adapted to be filled with compressed air at a relatively low pressure if required in the operation of the apparatus.

The operation of the apparatus of the embodiment according to the invention will be explained hereinafter.

It is assumed that the tire building apparatus is in the initial condition as shown in the upper half above the center line in FIG. 1. In this moment, the first sliders 6 are positioned in the proximity of axially outermost ends of the apparatus, while the second sliders 10 have been moved to the axially inner positions and stopped thereat because the cylinder chambers 13 are connected to the pressurized air source. Moreover, the support member assemblies 19 have been contracted to reduce their diameters. On the other hand, the movable blocks 27 have been moved axially outwardly until they abut against the stoppers 40 and stop thereat. Therefore, at this moment the link mechanism 37 is folded to its lowest position so that the diameter of the drum core 33 is the minimum value, awaiting for a next operation.

Thereafter, a cylindrical green case G is transferred into a position around the drum core 33 with the aid of a transfer means (not shown). At this time, bead portions B of this green case G are arranged radially outwardly of the support member assemblies 19. The cylinder chambers 20 are then connected to the pressurized air source to move the pistons 21 axially inwardly. At this moment, the rollers 23 engaging the inclined surfaces 22 of the pistons 21 are subjected to a force urging radially outwardly by a wedge action of the inclined surfaces 22. Consequently, the support member assemblies 19 move radially outwardly against the elastic force of the elastic rings 24 to increase their diameters. When the support member assemblies 19 abut against the bead portions B of the green case G, the expansion of the diameters of the assemblies 19 is stopped. At this moment, the support member assemblies 19 support the bead portions B of the green case G on its radially inner sides.

Figure 3:
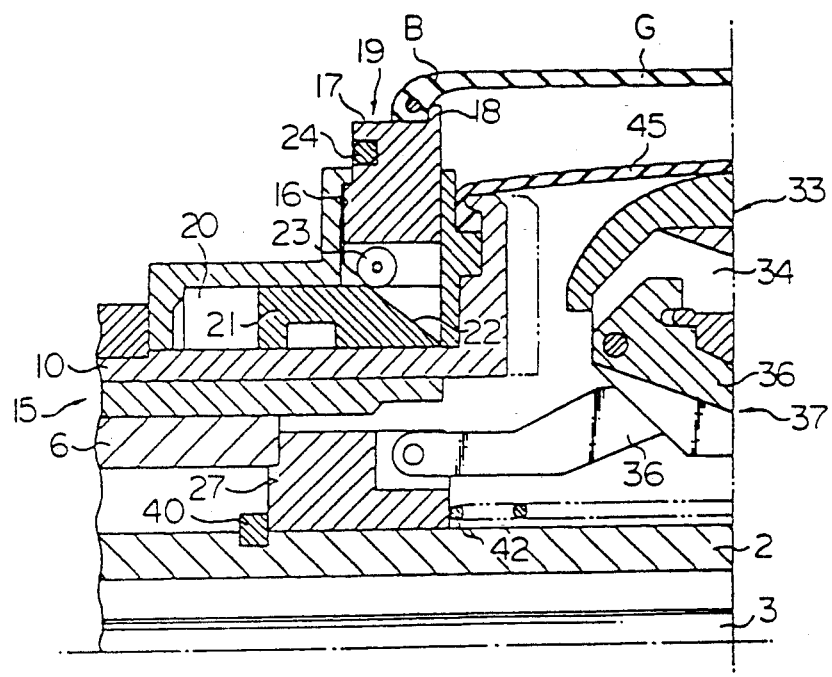
FIG. 3 is a sectional view illustrating a principal part of the apparatus showing a state axially positioning a green case.

Thereafter, the screw shaft 3 is rotated. In this case, as the male screw threads 4 threadedly engaging the screw blocks 8 of the slider units 15 have thread turns in opposite directions, the slider units 15 together with the support member assemblies 19 are moved axially outwardly away from each other from the positions shown in phantom lines in FIG. 3 to the positions shown in solid lines. On the way of the movements of the slider units 15 and the support member assemblies 19, the engagement portions 18 of the support member assemblies 19 abut against the inner sides of the bead portions B of the green case G. In this apparatus according to this embodiment, the slider units 15 and the support member assemblies 19 move through short distances continuously after the abutment of the portions 18 against the bead portions B. Consequently, both the bead portions B of the green case G are pulled axially outwardly by means of the engagement portions 18 so that the axially central portion of the green case G is brought into coincidence with the width center of the drum core 33.

In this case, the slider units 15 and the support member assemblies 19 are axially moved by the rotation of the screw shaft 3. Therefore, the moved distances of both the support member assemblies 19 are exactly equal to each other so that the green case G is axially positioned with high accuracy. On the other hand, both the movable blocks 27 abut against the stoppers 40, respectively, to limit the further axial outward movements as above described so that the slider units 15 are moved alone axially outwardly and the movable blocks 27 remain stationary since the start of the movement of the slider units 15.

As a result of this, when the axial positioning of the green case G is performed, the drum core 33 does not reduce its diameter from its minimum value and therefore the link mechanism 37 does not decrease it strength. Moreover, the slider units 15 move away from the movable blocks 27 by the movements of the blocks 27, so that the projections 29 are moved so as to partially remove from the insert grooves 28 of the movable blocks 27.

Thereafter, the pressurized air of relatively low pressure is supplied into the bladder 45. The cylinder chambers 13 are then connected to the vacuum source so that the second sliders 10 are subjected to the force urging them axially outwardly. Under this condition, the screw shaft 3 is rotated in the direction opposite to that in the operation above described so that the first sliders 6 are moved axially toward each other. At this moment, as the second sliders 10 are subjected to the force urging them axially outwardly, they are maintained substantially at the positions and the first sliders 6 are moved alone. Consequently, the second sliders 10 are prevented from interfering with the link mechanism 37 and at the same time the position of the green case G positioned with the high accuracy is securely maintained.

On the way of the movements above described, as the inner ends of the first sliders 6 abut against the axially outer ends of the movable blocks 27, the movable blocks 27 are moved axially inwardly together with the first sliders 6 in unison, compressing the spring 42. When the movable blocks 27 are moved axially inwardly toward each other in this manner, the links 36 of the link mechanism are rocked with their inner ends moving away from the main shaft 2 so that the drum core 33 moves radially outwardly to increase its diameter. When the drum core 33 expands to increase its diameter in this manner, distances of the segments 34 of the drum core 33 progressively increase. However, as the drum core 33 is covered by the bladder 45 filled with the pressurized air of the relatively low pressure, the green case G is subjected to uniform expanding force on its inside.

When the drum core 33 expands to increase its diameter, the axially center portion of the green case G progressively expands radially outwardly. Upon this expansion, the second sliders 10 abut against the stoppers 14 and move axially inwardly together with the first sliders 6 in unison. The green case G is formed into a toroidal shape in this manner.

Thereafter, a belt, a tread and the like are pressure-joined to the outside of the green case G, while stitching is applied thereto to form a green tire T as shown in the lower half of FIG. 1. The formed green tire is then grasped on its outside by means of transfer means (not shown) and then the cylinder chambers 20 are connected to the vacuum source so that pistons 21 are moved axially outwardly. As a result of this, the support member assemblies 19 move radially inwardly to reduce the diameters with the aid of the elastic force of the elastic rings 24 so that the support member assemblies 19 disengage from the bead portions B of the green tire T.

The pressurized air filled in the bladder 45 is then exhausted from the bladder 45, while the screw shaft 3 is then rotated again so that the first sliders 6 are moved away from each other. At this moment, the movable blocks 27 are moved axially outwardly together with the first sliders 6 abutting against the movable blocks, respectively, so that the drum core 33 contracts to reduce its diameter in conjunction with the contraction of the bladder 45. When the movable blocks 27 engage the stoppers 40 owing to the outward movement of the first sliders 6, the movable blocks 27 are prevented from further axially outward movement by means of the stoppers 40 and stopped thereat.

At this moment, the diameter of the drum core 33 is the minimum, while upon stopping the movable blocks 27, the rotating screw shaft 3 has just been stopped and the first sliders 6 have been returned in their original positions. On the other hand, the cylinder chambers 13 are connected to the pressurized air source to move the second sliders 10 axially inwardly toward the initial positions. Thereafter, the green tire T is transferred out of the apparatus by means of the transfer means. In this embodiment, moreover, the first sliders 6 are exactly positioned by always detecting the amount of rotation of the screw shaft 3 by means of known encoders.

In this embodiment, furthermore, while the first sliders 6 are formed with the projections 29 and the movable blocks 27 are formed with the insert grooves 28 into which the projections 29 are inserted, it is clear that the movable blocks 27 may be formed with projections and the first sliders 6 may be formed with insert grooves for receiving the projections. Moreover, the first sliders 6 and the movable blocks 27 may be quite separated, while the first sliders 6, the movable blocks 27 and the main shaft 2 may be connected by means of spline connections or key connections to prevent relative rotating movements therebetween.

As can be seen from the above description, with the apparatus according to the invention a green case can be axially positioned with high accuracy. Moreover, the apparatus according to the invention is simple in construction and small-sized as a whole.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire building apparatus comprising a rotatable main hollow shaft, a rotatable screw shaft inserted in the main shaft and formed on both end portions with male screw threads in opposite directions, a pair of slider units axially movably supported on the outer circumference of the main shaft at both end portions and connected to the screw shaft so that upon rotating the screw shaft the slider units move through equal distances toward and away from each other, a pair of bead support member assemblies expansibly and contractibly supported by the sliders units, respectively, and having engagement portions able to engage inner surfaces of bead portions of a green case so that the bead portions of the green case are supported on radially insides by the support member assemblies when expanded to increase their diameters, a pair of movable blocks axially movably supported on the outer circumference of the main shaft between the slider units to be able to abut against the slider units, a drum core substantially in the form of a ring provided to surround the main shaft between the slider units and composed of a plurality of segments circumferentially spaced, a link mechanism composed of a plurality of links connecting the drum core and the movable blocks and capable of expanding the drum core to increase its diameter when the movable blocks move axially inwardly toward each other and contracting the drum core to decrease its diameter when the movable blocks move axially outwardly away from each other, a pair of stoppers provided on the outer circumference of the main shaft between the slider units and the movable blocks to limit axially outward movement of the movable blocks by engagement of the stoppers with the movable blocks when the drum core contracts to its minimum diameter, and a spring interposed between the pair of movable blocks for urging the movable blocks axially outwardly, thereby permitting the movable blocks to move together with the slider units on inner sides of positions where the movable blocks abut against the stoppers and permitting the slider units alone to move axially outwardly when the movable blocks abut against the stoppers.

2. The tire building apparatus as set forth in claim 1, wherein each of said slider units is composed of a first cylindrical slider and a second cylindrical slider, the first slider being axially movably supported on the main shaft and secured to a screw block inserted in a slit formed in the main shaft, and the second slider being axially movably supported by the first slider.

3. The tire building apparatus as set forth in claim 2, wherein said second slider has an annular piston formed on its inner surface and the first slider is provided on its outer circumference with a stationary ring fixed thereto to form a cylinder chamber between the piston and the stationary ring, thereby moving second sliders axially inwardly toward each other when pressurized air is supplied into cylinder chambers and axially outwardly away from each other when a vacuum source is connected to the cylinder chambers.

4. The tire building apparatus as set forth in claim 1, wherein said support member assemblies are composed of a plurality of support segments radially movably inserted into a plurality of radially extending guide grooves formed in the slider units circumferentially equally spaced, and each of the support segments is formed with an engagement portion at an axially inner end on a radially outer surface to engage inner surface of each of the bead portions of the green case.

5. The tire building apparatus as set forth in claim 4, wherein said slider units further comprise pistons axially movably inserted into cylinder chambers formed in the slider units corresponding to the guide grooves, respectively, each of said piston being formed with an inclined surface on an axially inner side on the outer circumference and inclined axially inwardly toward the screw shaft, rollers rotatably supported by radially inner ends of the support segments, respectively, and elastic rings provided on the support segments, respectively, thereby expanding the support member assemblies when the cylinder chambers are connected to a pressurized air source and contracting the support member assemblies when the cylinder chambers are connected to a vacuum source.

6. The tire building apparatus as set forth in claim 1, wherein the movable blocks and the slider units are formed with a plurality of projections circumferentially spaced and a plurality of insert grooves circumferentially spaced for receiving the projections, thereby permitting the movable blocks and the slider units to move axially relative to each other, but preventing their relative rotating movement.

* * * * *